J. BRASLIN.
Machine for Making Flower-Pots.
No. 203,408.  Patented May 7, 1878.
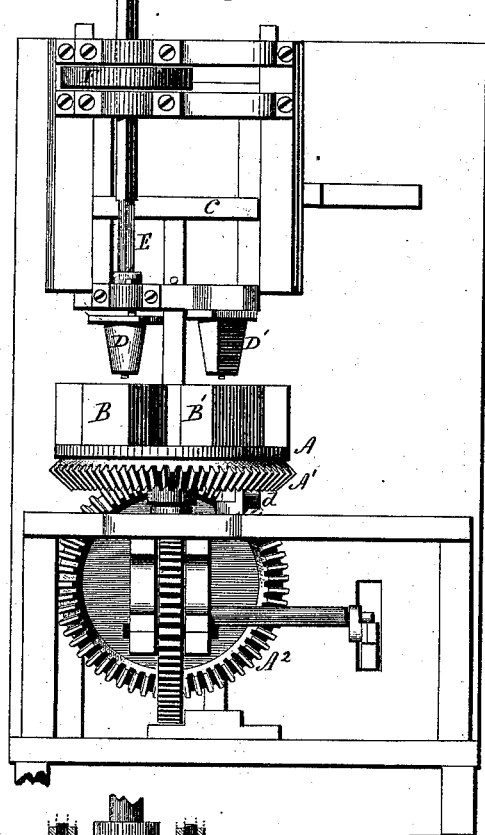
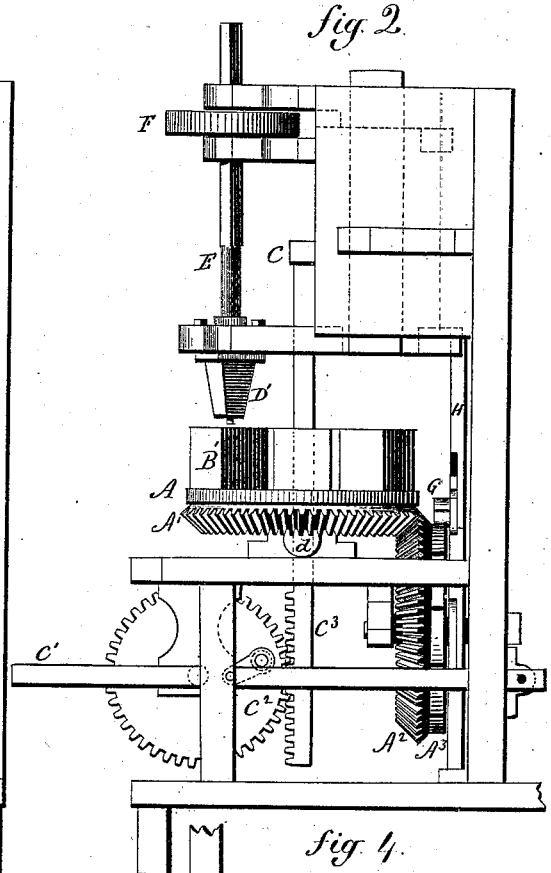
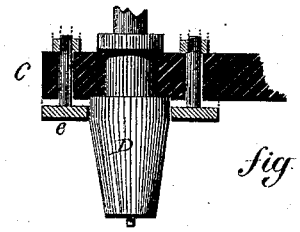
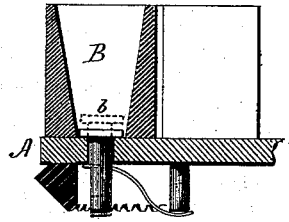
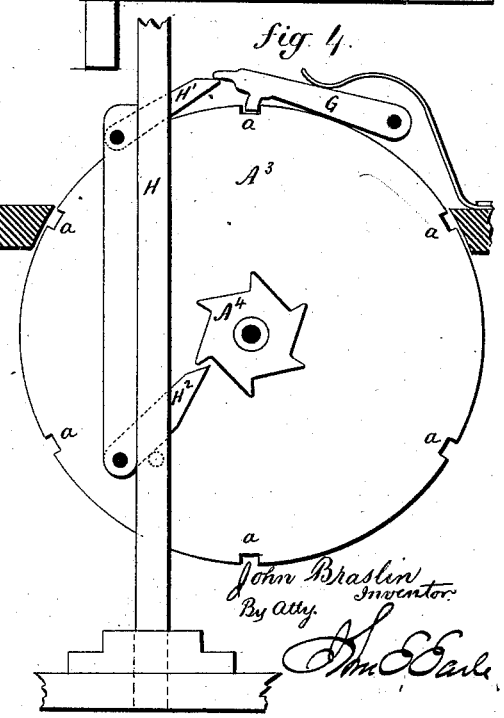

UNITED STATES PATENT OFFICE.

JOHN BRASLIN, OF FAIR HAVEN, CONNECTICUT.

IMPROVEMENT IN MACHINES FOR MAKING FLOWER-POTS.

Specification forming part of Letters Patent No. 203,408, dated May 7, 1878; application filed October 26, 1877.

*To all whom it may concern:*

Be it known that I, JOHN BRASLIN, of Fair Haven, in the county of New Haven and State of Connecticut, have invented a new Improvement in Machines for Making Flower-Pots; and I do hereby declare the following, when taken in connection with the accompanying drawings and the letters of reference marked thereon, to be a full, clear, and exact description of the same, and which said drawings constitute part of this specification, and represent, in—

Figure 1, a front view; Fig. 2, a side view; Figs. 3 and 4, detached views.

This invention relates to an improvement in machines for molding flower-pots from clay; and the invention consists in the combination of mechanism, as hereinafter described, and more specially recited in the claims, whereby the shaping of the pot is made automatic.

Referring to the drawings, A is the working-table, supported on a central shaft, and so as to be rotated. On this table A several molds, B B', &c., are arranged, more or less in number. The interior of the molds is shaped corresponding to the exterior of the pot to be produced.

Above the table A is a vertical carriage, C, carrying, first, a rotary former, D, and, second, a finishing-former, D'. The rotary former D is attached to the lower end of the shaft E, its upper end passing through a pulley, F, loosely, and so as to slide freely through the pulley, yet is caused to revolve with the pulley, the pulley being stationary axially.

The carriage C has a reciprocating movement up and down imparted to it through a pedal, $C^1$, acting through a pinion, $C^2$, on a rack, $C^3$, in connection with the carriage C, as seen in Fig. 2, so that by depressing the pedal $C^1$ the carriage, with the formers, will be correspondingly depressed, and by raising the pedal those parts will be correspondingly raised.

A rotary movement is imparted to the table A through beveled gears $A^1$ on the table and $A^2$ on the transverse shaft. On the transverse shaft of the gear $A^2$ is a disk, $A^3$, having in its periphery several notches, $a$, corresponding to the number of molds. A pawl, G, (see Fig. 4,) is arranged to fall into one of these notches, and in this condition will prevent the turning of the disk and the working-table. From the carriage a rod, H, extends down close to the disk $A^3$, and on this is a trip, $H^1$, which, as the carriage and rod H rise, will raise the pawl G from its notch and free the disk. This done, a pawl, $H^2$, on the rod H engages a ratchet, $A^4$, on the shaft of the gear $A^2$, and, during the ascent of the carriage C, turns the disk $A^3$ till a second notch is presented to the pawl G and a new mold presented to the formers. Then, the carriage C descending, the pawl G re-engages the disk $A^3$ and holds the molds in their new position.

The operation of the machine is as follows: A ball of clay, sufficient in quantity and properly prepared, is placed in the mold next preceding the preliminary former D, then the machine is started. The mold containing that ball will, in its turn, be pressed beneath the rotating or preliminary former D on the carriage C, pressed to force the former D into the clay, and will spread or distribute the clay in the mold, leaving a cavity corresponding to the former D. Then, rising from the mold, another movement is imparted to the mold to present it to the second former D'. Again the carriage is forced down, the second former enters the mold containing the partially-formed pot, and completes the shaping. Passing on, a false bottom, $b$, in the mold is raised, as indicated in broken lines, Fig. 3, lifting the pot from the mold so far that it may be easily taken by the workmen, and is subsequently treated in the usual manner for such clay-work.

The raising of the false bottom $b$ is here represented as produced from a stem through the bottom riding upon a stationary roll, $d$; but various devices may be employed to give this preliminary start from the mold.

To prevent the clay from clinging to the former, a loose ring or follower, $e$, is arranged around the follower, as seen in Fig. 3, which will yield to the rising clay, but is of sufficient weight or force to rest upon the clay when the follower rises and until the carriage C engages the follower, so as to lift it with the former.

The final shaping-former D', as also the molds, it will be understood, are to correspond, respectively, to the interior and exterior of the pot, and may be varied accordingly.

I claim—

1. The combination of the series of molds, having intermittent rotary movement imparted thereto, with one or more reciprocating formers, to one of which a rotary motion is imparted, all substantially as and for the purpose described.

2. The combination of the series of molds, having intermittent rotary movement imparted thereto, with one or more reciprocating formers, to one of which a rotary motion is imparted, and a false bottom, b, arranged to be raised after the completion of the pot, substantially as and for the purpose described.

3. The combination of the series of molds, having intermittent rotary movement imparted thereto, with one or more reciprocating formers, to one of which a rotary motion is imparted, and with the loose follower e attached to the carriage, all substantially as and for the purpose described.

JOHN BRASLIN.

Witnesses:
   E. A. DANIELS,
   J. R. HENRY.